US006597443B2

(12) United States Patent
Boman (10) Patent No.: US 6,597,443 B2
(45) Date of Patent: Jul. 22, 2003

(54) SPATIAL TRACKING SYSTEM

(76) Inventor: Duane Boman, 21848 Corte Madera La., Cupertino, CA (US) 95014

( * ) Notice: Subject to any disclaimer, the term of this patent is extended or adjusted under 35 U.S.C. 154(b) by 0 days.

(21) Appl. No.: 09/894,651

(22) Filed: Jun. 27, 2001

(65) Prior Publication Data

US 2003/0002033 A1 Jan. 2, 2003

(51) Int. Cl.[7] .......................... G01B 11/26; G09G 5/08; G01C 17/00
(52) U.S. Cl. ............... 356/139.03; 345/158; 356/141.5; 702/153
(58) Field of Search ..................... 345/158; 356/139.03, 356/139.04, 141.5; 702/153

(56) References Cited

U.S. PATENT DOCUMENTS

| | | | | |
|---|---|---|---|---|
| 4,792,697 A | * | 12/1988 | Le Parquier et al. | |
| 4,834,531 A | * | 5/1989 | Ward | |
| 4,836,778 A | * | 6/1989 | Baumrind et al. | |
| 4,988,981 A | * | 1/1991 | Zimmerman et al. | |
| 5,196,689 A | * | 3/1993 | Sugita et al. | 250/206.1 |
| 5,424,556 A | * | 6/1995 | Symosek et al. | |
| 5,686,942 A | * | 11/1997 | Ball | 345/158 |
| 5,923,417 A | * | 7/1999 | Leis | 356/141.1 |
| 5,926,264 A | * | 7/1999 | Beale et al. | 356/139.03 |
| 5,929,168 A | * | 7/1999 | Ikkala et al. | 345/158 |
| 5,982,352 A | * | 11/1999 | Pryor | 345/156 |
| 6,266,136 B1 | * | 7/2001 | Ramer et al. | 356/139.03 |

* cited by examiner

*Primary Examiner*—Stephen C. Buczinski
(74) *Attorney, Agent, or Firm*—Glenn Patent Group; Michael A. Glenn; Kirk D. Wong (57) ABSTRACT

A spatial tracking system tracks movements of sources of radiated energy. In the one embodiment of the invention, three sensor sets are included each containing a pair of sensors. Movements of a single radiation source with a radially symmetric emission pattern is tracked in up to six dimensions; X, Y, Z, yaw, pitch and radiation intensity. Sources with different radiation ranges or types are tracked at the same time using sensors tuned to the different radiation ranges or types. The sensor sets may include more than two sensors which increases the spatial range monitored and increases tracking accuracy and optionally include sensors tuned to different radiation sources, such as light of different wavelengths. Individual sensors can be included with the sensor sets which increase the rotational range of the system beyond the range for translation tracking.

47 Claims, 11 Drawing Sheets

SPATIAL TRACKING SYSTEM

BACKGROUND OF THE INVENTION

1. Technical Field

The invention relates to detecting and tracking moving objects in a computer environment. More particularly, the invention relates to tracking translational and rotational movements of an object in a computer environment.

2. Description of the Prior Art

A variety of systems exist for tracking movements of objects. These systems track anywhere from a single dimension up to six dimensions. Some are specific for translations of objects in the three dimensions of a Cartesian coordinate system, while others track rotations of objects. There are also a variety of uses for these systems, ranging from motion tracking for animation production to controlling the movements of a cursor on a computer screen.

Many systems are available that track object movement by detecting the location of the object at frequent intervals and calculating the object's motion as a sequence of location changes. The types of devices used for object location tracking include electromagnetic, acoustic, image-based, and optical systems.

Electromagnetic systems utilize transmitters than generate three orthogonal electromagnetic fields and detectors that include three orthogonal coils. Acoustic systems measure the time-of-flight of an acoustic wave from one or more transmitters to three or more detectors. Image-based systems utilize images from cameras that are then processed in a computer to locate specified objects.

Optical tracking systems usually use one of two main principles. One principle involves a scanned light source. Under these conditions, the timing for detection of the scanned source is used to determine the position of the light source. Other systems use multiple detectors that simultaneously monitor a continuous or flashed light source. These systems tend to be very expensive and many are limited in the number of dimensions that can be tracked.

Systems are also available that track object movement independently from the object's location. Inertial systems are available that utilize accelerometers or gravitational field sensors. Gyroscopic devices are also available for detecting object motion but tend to be both large and inaccurate. These systems are also limited in the number of dimensions that can be tracked.

The computer mouse is the most widely used movement tracking device. Most computer mice can only track movement in two dimensions of translation. U.S. Pat. No. 5,393,970 describes a location tracking device that uses methods to track object location. However, this approach does not track rotations or reflections of light sources.

Some systems have been developed to track additional dimensions by including an accelerometer or gyroscope. Trackballs, joysticks and digitizing pads are also used for monitoring movements. Each of these devices has the limitation of only being able to monitor two dimensions at a time.

Other systems cannot measure rotational movement such as U.S. Pat. No. 5,892,501 which describes a wireless pointing device for cursor movement. This device uses a combination of ultrasonic and optical tracking components and does not measure rotational movement.

It would be advantageous to provide a spatial tracking system that provides an inexpensive system that monitors up to six dimensions at a time. It would further be advantageous to provide a spatial tracking system that does not require cabling between emitter and detector systems and is adaptable to a wide range of uses.

SUMMARY OF THE INVENTION

The invention provides a spatial tracking system. The system provides an inexpensive device that monitors up to six dimensions at a time. In addition, the invention does not require cabling between emitter and detector systems and is adaptable to a wide range of uses.

A preferred embodiment of the invention tracks movements of sources of radiated energy. In one embodiment of the invention, three sensor sets are included. Each sensor set includes a pair of sensors. Movements of a single radiation source with a radially symmetric emission pattern is tracked in up to six dimensions; X, Y, Z, yaw, pitch and radiation intensity. The invention is very useful for tracking over a limited spatial range and can be used to produce low-cost movement tracking systems.

Movements of more than one radiation source can be tracked by the invention. One method to track more than one radiation source is to have only one source active at any time. Another method is to have the different radiation sources turn on and off at different frequencies and employ methods that distinguish which sources are active at any time.

Sources with different radiation ranges or types are tracked at the same time using sensors tuned to the different radiation ranges or types. The ability to track more than one radiation source is useful for tracking multiple objects, multiple parts of an object, or multiple body parts.

The sensor sets may include more than two sensors. Increasing the number of sensors within a set increases the spatial range monitored and increases tracking accuracy. These sets optionally include sensors tuned to different radiation sources, such as light of different wavelengths. Two or more sensors are typically included for each type of energy source being tracked.

Other embodiments of the invention include more than three sensor sets. Increasing the number of sensor sets significantly increases the spatial range for the tracking system. This is particularly useful when tracking objects or people over large areas. It is also useful for tracking different parts of the body. Increasing the number of sensor sets also improves system accuracy. The different sensor sets could also include sensors tuned to different energy sources.

Individual sensors can be included together with the sensor sets and are useful for increasing the rotational range of the system beyond the range for translation tracking. Individual sensors provide background information or information from different radiation sources than those being tracked by the accompanying system.

Other aspects and advantages of the invention will become apparent from the following detailed description in combination with the accompanying drawings, illustrating, by way of example, the principles of the invention.

DETAILED DESCRIPTION OF THE INVENTION

The invention is embodied in a spatial tracking system in a computer environment. A system according to the invention provides an inexpensive device that monitors up to six dimensions at a time. In addition, the invention does not require cabling between emitter and detector systems and is adaptable to a wide range of uses.

The invention provides a system that tracks movements of sources of radiated energy. A variety of low-cost movement tracking systems can be easily produced with this technology.

The invention includes a source of radiated energy and a number of sensor sets. Each sensor set includes two or more sensors. The sensors within a set are located close to one another and usually have an angle between their primary axes to help differentiate their sensing areas. Electronics may be included to amplify and smooth the signals, digitize them, combine information from selected sensors and transmit this information to a computer or other electronic equipment. In other embodiments of the invention, reflections of the radiated energy are tracked.

The radiation sources that are tracked by the invention include radiated light, sound, or other emissions. Translations of one or more radiation sources are tracked in three dimensions of a Cartesian coordinate system (commonly referred to as X, Y, and Z directions) with rotations of the sources tracked in up to three angular dimensions (commonly referred to as yaw, pitch and roll). Translations and rotations are tracked independent of the absolute position or orientation of the source. The invention works with a variety of emission dispersion profiles, although a radially symmetric profile is usually preferred.

The tracking capabilities are not dependent on radiation intensity and, in many embodiments, the intensity of the radiation source is calculated from the sensor signals.

Tracking systems using the invention have a variety of uses. One major use is to input commands to computers and other electronic equipment. Detected movements of the radiation source generate movements of a cursor or other icons or objects on a computer screen. Detected movements of the radiation source can also be interpreted as gestures that are linked to specific commands, e.g., an up and down movement of the radiation source indicates a positive response to a question.

Another use of these tracking systems is to monitor movements of objects, people, or body parts. Spatial tracking systems are used for motion capture when producing animation in computer games, video production, movie production and virtual environments. Spatial tracking systems are also finding increased use in physical therapy and sports related movement analysis. The invention can also be used for monitoring objects on assembly lines and providing commands for robotic systems.

The invention provides means for creating low-cost movement tracking systems that have the range, speed and accuracy needed for these various uses. These systems use a variety of radiation sources such as: light of a specific wavelength; a broad spectrum light source; infrared radiation; sound; or ultrasound. Radiation sources of different types can even be combined. The radiation sources can be mounted, for example, on hand-held devices such as a pen or stylus, on parts of the body using straps or bands, or on objects or robots.

Referring to FIGS. 1a, 1b, 2a, 2b, and 2c, a simple embodiment of the invention is shown. Three sensor sets 101, 102, and 103 with associated electronics 104 and a mounting surface 109 are used. Each sensor set includes two infrared photodiodes. The two photodiodes 202 and 203 in the sensor set 201 are situated adjacent to one another on sensor holder 204, with a slight angle between their primary optical axes. Two other sensor sets 205 and 209 also include photodiode pairs 206, 207 and 210, 211. In each sensor set, the sensing areas of the two photodiodes overlap but are not the same with this arrangement. The three sensor sets 201, 205, 209 are separated by a distance that is much larger than the distance between the sensors 202, 203 in the set 201, 206, 207 in the set 205 and 210, 211 in the set 209.

Figure 1A:
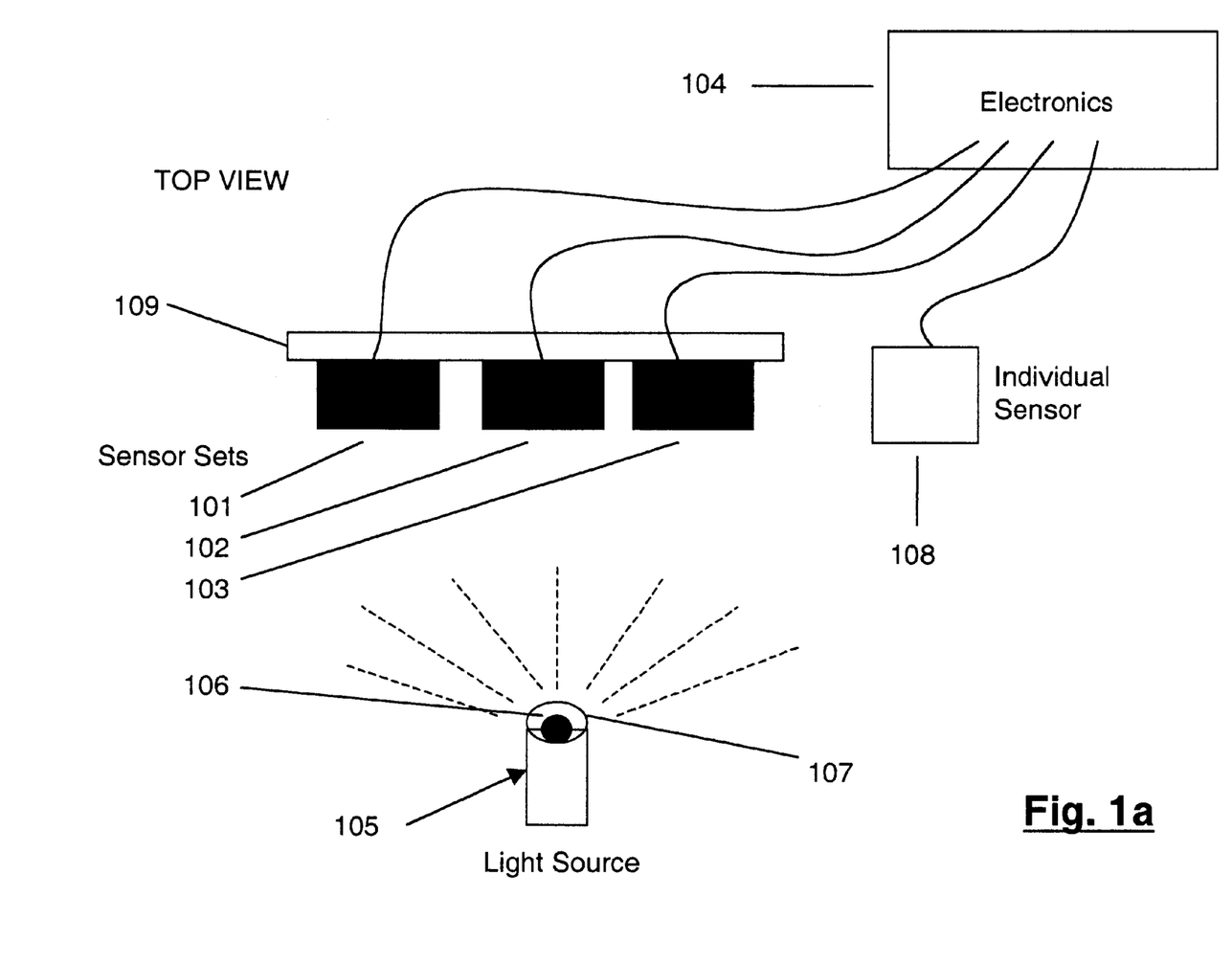
FIG. 1a is a block schematic diagram of a top view of a simple embodiment of the invention comprising three sensor sets and a radiation source according to the invention.
Figure 1B:
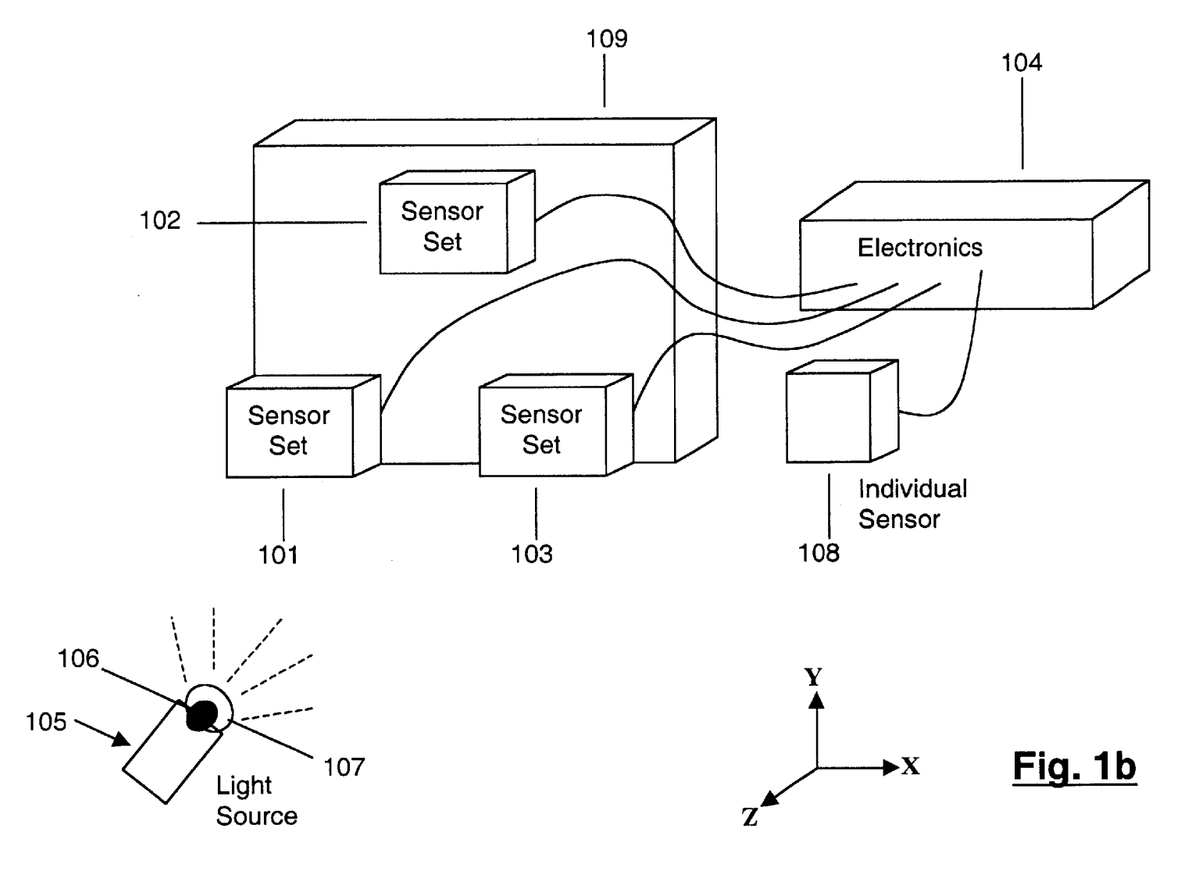
FIG. 1b is a block schematic diagram of a perspective view with an XYZ coordinate background of a simple embodiment of the invention comprising three sensor sets and a radiation source according to the invention.

An infrared light source 105 is used in this example. A diffusing filter 107 is placed between an infrared LED 106 and the sensor sets 101, 102, 103 to produce a radially symmetric light profile. Electronics are included that turn the light source 105 on and off to produce a square wave signal when a button is pressed. If more than one button is provided, the duty cycle or symmetry of the square wave is changed to indicate which button or group of buttons is being pressed.

Figure 2A:
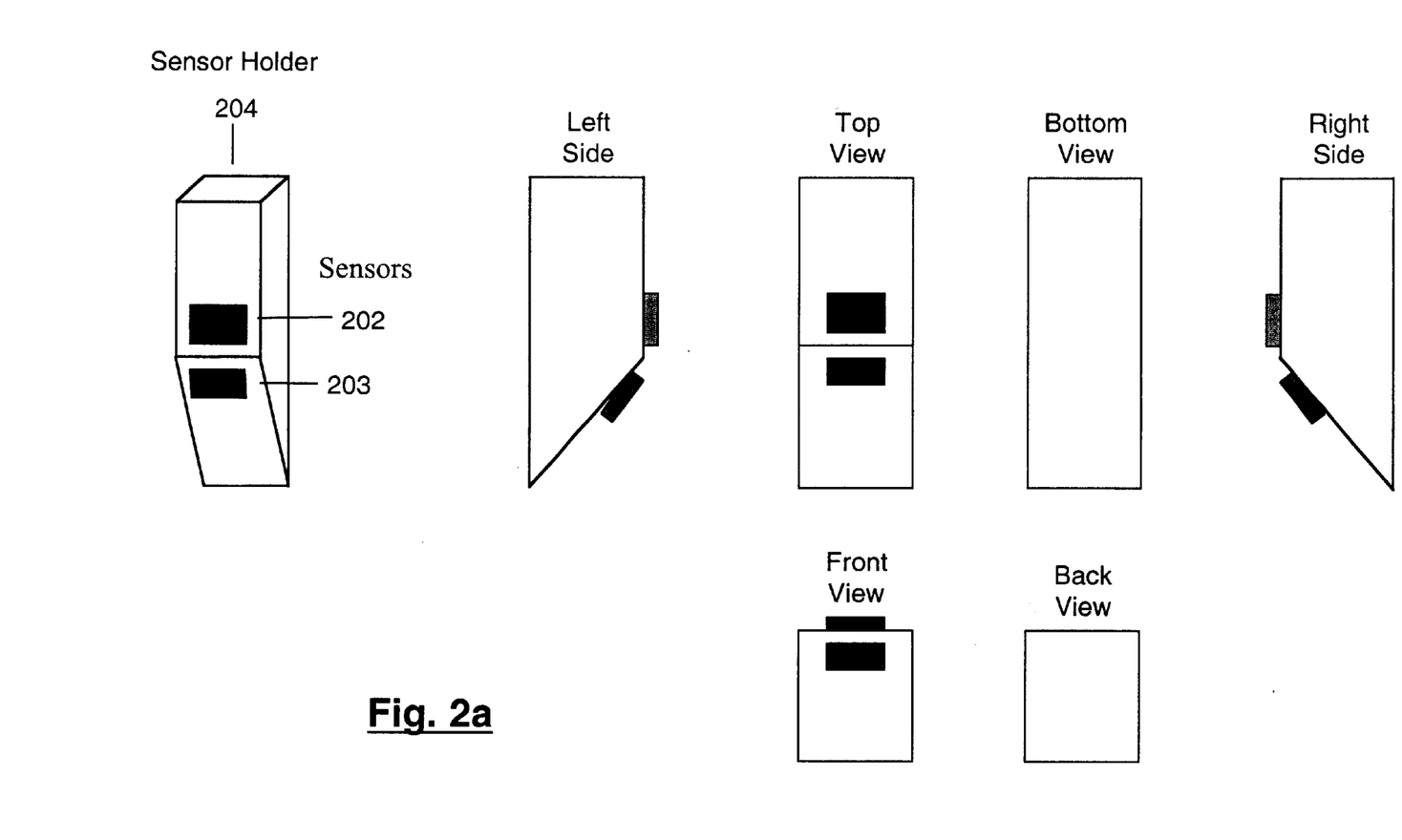
FIG. 2a is a block schematic diagram of the sensor sets and their placement in the system showing a front and a side view of a sensor set with two sensors according to the invention.
Figure 2B:
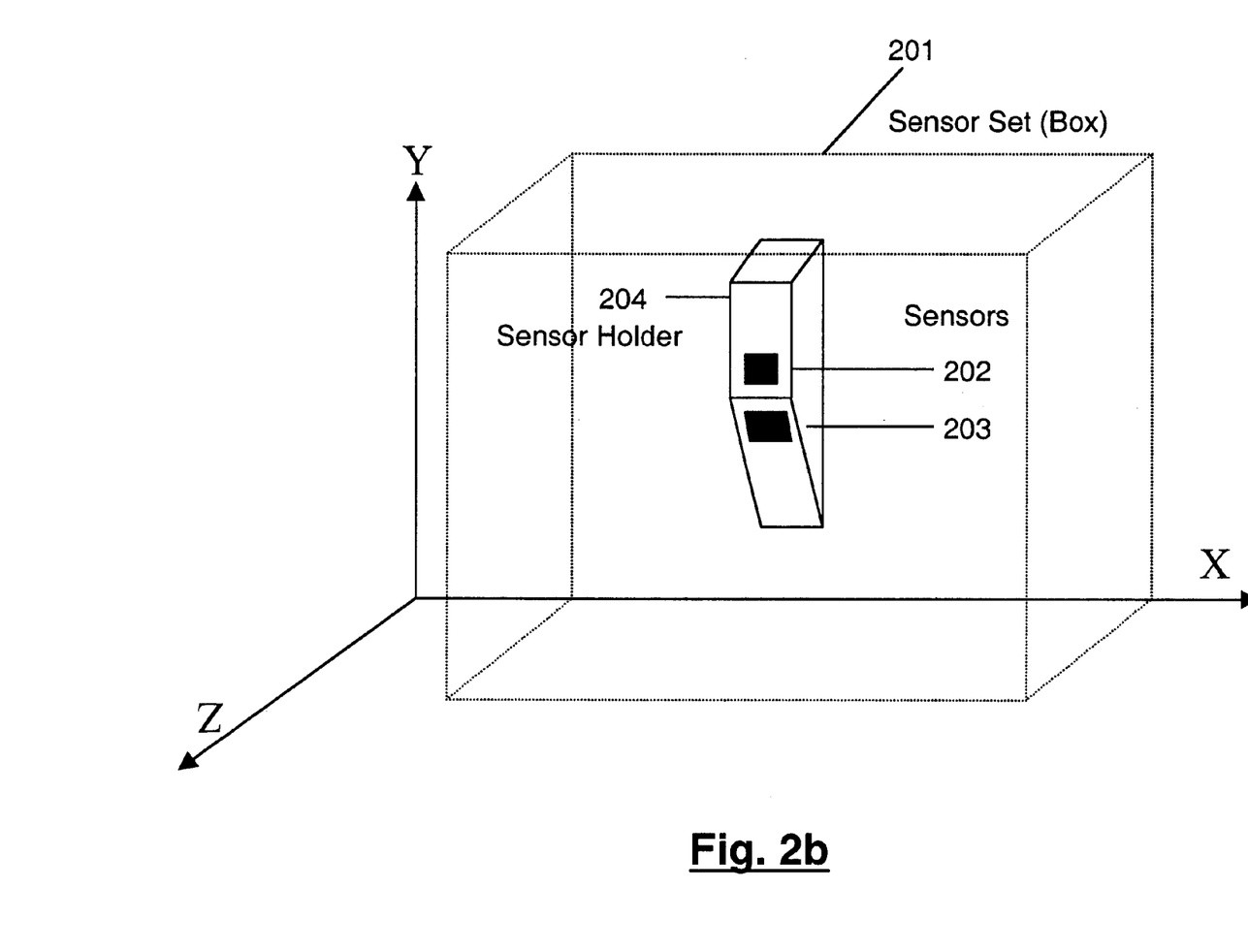
FIG. 2b is a block schematic diagram of the sensor sets and their placement in the system showing the placement of a sensor pair as they are mounted in the system relative to an XYZ coordinate system according to the invention.
Figure 2C:
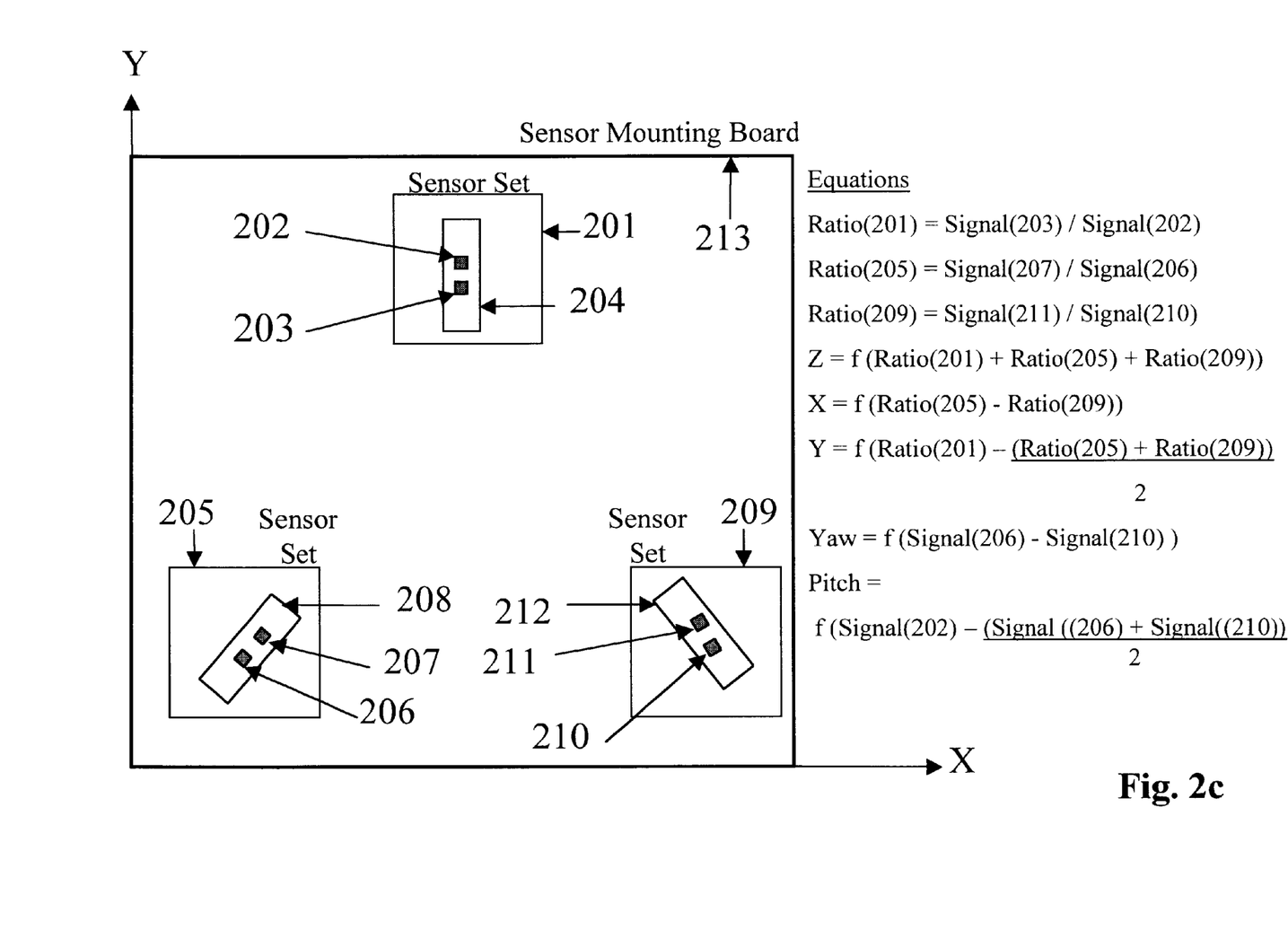
FIG. 2c is a block schematic diagram of the sensor sets and their placement in the system showing three sensor sets with two sensors each as mounted in a simple embodiment of the system and sample equations according to the invention.

The signal from each sensor 202, 203, 206, 207, 210, 211 is amplified and then digitized with an analog-to-digital converter. Two readings are taken from each sensor 202, 203, 206, 207, 210, 211, one with the light source on and one with it off. The reading with the light off provides a background signal that is subtracted from the signal with the light on. The remainder provides a measurement of the intensity of the light from the LED that falls on a sensor.

The background signal can be measured 1/60th of a second after the measurement with the light source on to remove the effects of AC lights. This measurement is affected by the absolute intensity of the light source, the angle between the primary axis of the light source and the position of the sensor, the angle between the primary axis of the sensor and the position of the light source, and the distance between the sensor and light source.

Figure 3:
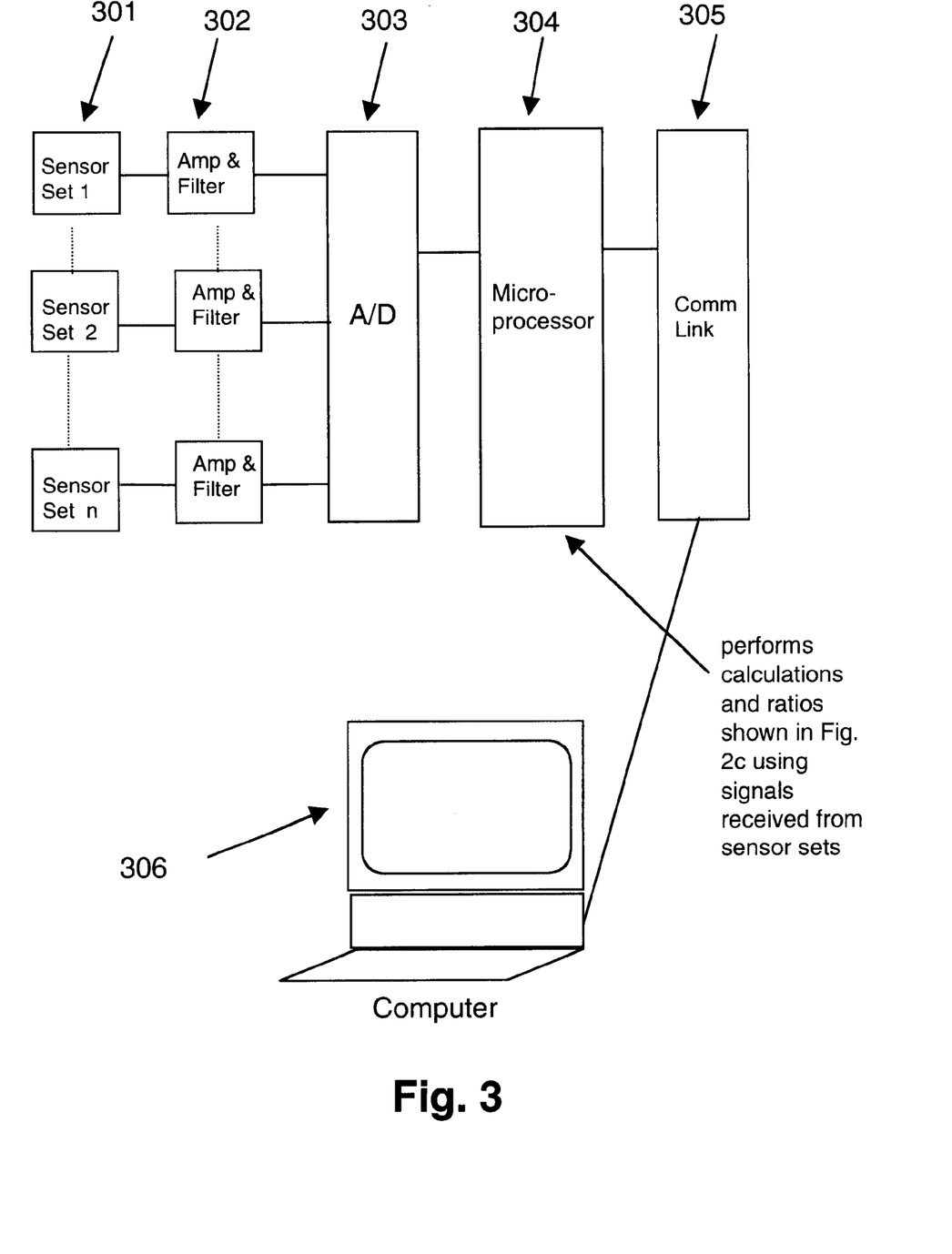
FIG. 3 is a block schematic diagram of a simplified circuit diagram for a position and orientation tracking system according to the invention.

With respect to FIG. 3, an embodiment of the control circuits for the movement tracking device is shown. A number of sensor sets 301 are connected to amplifier and filter circuits 302 that are in turn connected to a series of analog-to-digital converters 303. An embedded microprocessor system 304 controls the timing for analog-to-digital conversions, stores the sampled values, and communicates with a computer 306 through a communications connection such as a serial or USB connection 305. Calculations on the sampled values are performed within the microprocessor system 304, by the computer 306, or by both systems. The microprocessor system can also turn the radiation sources on and off, although this requires wiring or a control mechanism between the microprocessor and the radiation sources. In many conditions it is preferable to not include wiring between the radiation sources and the rest of the tracking system.

Ratios of the light signals from each sensor pair are then calculated. These ratios are nearly independent of the angle between the primary axis of the light source and the position of the sensor and also of the absolute intensity of the light source. The ratios primarily depend on the angle between the primary axis of each sensor and the position of the light source. With many sensors, the output signal from the sensor is a function of the cosine of this angle.

These ratios can be used to determine the position of the light source with respect to the sensor sets. Under ideal condition in which there is no offset between the locations of the sensors within a pair, these ratios describe planar surfaces that are a function of the X, Y, and Z coordinates. The intersection of the planes determined for the three sensor sets is the location of the light source.

Figure 4:
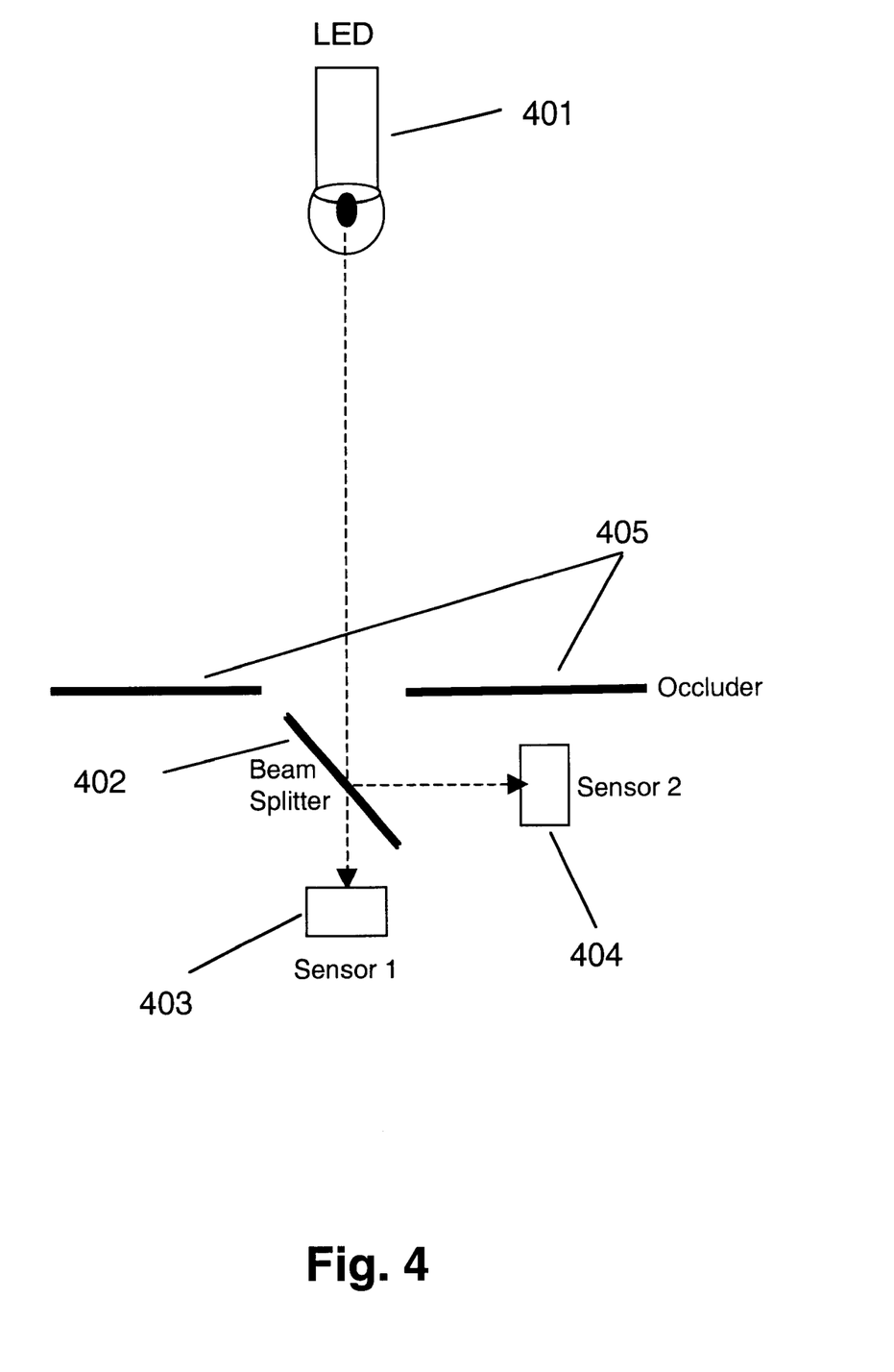
FIG. 4 is a block schematic diagram of a sensor set with two sensors and a beam splitter according to the invention.

Referring to FIG. 4, a design for a sensor pair 403, 404 that provides this ideal situation is shown. This design utilizes a beam splitter 402 that reflects a portion of the light from a light source 401 onto one sensor 404 while passing the remainder of the light to another sensor 403. To provide the required ratios between the sensor outputs, the two sensors 403, 404 have a small angular offset in addition to the angular offset required for receiving the light reflected by the beam splitter 402. An occluder 405 is included to ensure that the sensor 404 only receives light that has been reflected by the beam splitter 402. Although such a system provides accurate localization of the light source with simple calculations, it also reduces the light intensity to each sensor and reduces the range through which the light can be tracked.

Changes in the ratios described above are used to calculate translational movements of the radiation source. Very simple calculations can be used in this determination. These ratio changes provide movement information without reference to the absolute location of the source. For example, with the sensor arrangements shown in FIGS. 1a, 1b, and 2c, a horizontal movement (a change along the X axis of the system) is determined by subtracting the ratios from the bottom (depending on the orientation layout) two sensor sets 101, 103 or 205, 209 and calculating changes in this difference over time. Smoothing algorithms can be incorporated into this calculation to reduce noise in the signals.

Similarly, vertical movements (changes along the Y axis of the system) are determined by taking the average of the ratios from the bottom two sensor sets 101, 103 or 205, 209 and subtracting this average from the ratio from the top sensor set 102 or 201. Movements in depth (changes along the Z axis of the system) are determined by calculating changes in the sums of the ratios from the three sensor sets. Example equations for these calculations are shown in FIG. 2c.

Many other algorithms are available for calculating these movements. For example, horizontal and vertical movements can be determined by having each of the three ratio changes describe a vector. The direction of each vector is orthogonal to the plane through the midpoint between the two sensors in each set. Summing these vectors provides a movement vector in the X-Y plane.

The accuracy of these calculations can be improved by several methods. First, standard smoothing algorithms can be incorporated. Second, corrections can be made to the calculations to reduce the affect of distance on the ratio changes. This can be accomplished by using the sum of the ratios to approximate the location of the radiation source along the Z axis of the system. Also, low-level signals can be excluded from the calculations.

Orientation changes of the light source are also determined using simple calculations. For these calculations, the light signal from one sensor in each set is used. These three signals are used to produce three ratios. These ratios are produced by dividing one signal by another or by dividing the difference between the signals from two sensors by the sum of the signals from these sensors. Changes in yaw angle are then determined by calculating the change in the ratio using the bottom two sensor sets. Similarly, pitch changes are determined by calculating changes in the average of the other two ratios. Once again, there are many other algorithms available for calculating rotational movements. Example equations for these calculations are shown in FIG. 2c.

Changes in roll angle are determined using a single light source or by using multiple light sources. A single light source with a nonsymmetric emission profile is used to monitor roll angle changes.

More than one light source can be included in this and other embodiments of the invention. To distinguish between light sources when more than one light source is included, the light sources should either be illuminated one at a time or the periodicity of the light sources should allow individual lights to be detected. With two light sources on an object, angles of roll can be easily determined. Two or more light sources are also used to monitor translations and rotations of multiple objects or body parts.

Other embodiments of the invention include sensor sets with more than two sensors. Increasing the number of sensors in a sensor set greatly increases the spatial range over which a radiation source is detected as well as increasing the accuracy of translational and rotational calculations by creating overlapped detection ranges. Information from any sensor set is used whenever an adequate signal is read from at least two sensors in the set. If an adequate signal is read from more than two sensors, additional ratios are utilized in the calculations.

Figure 5:
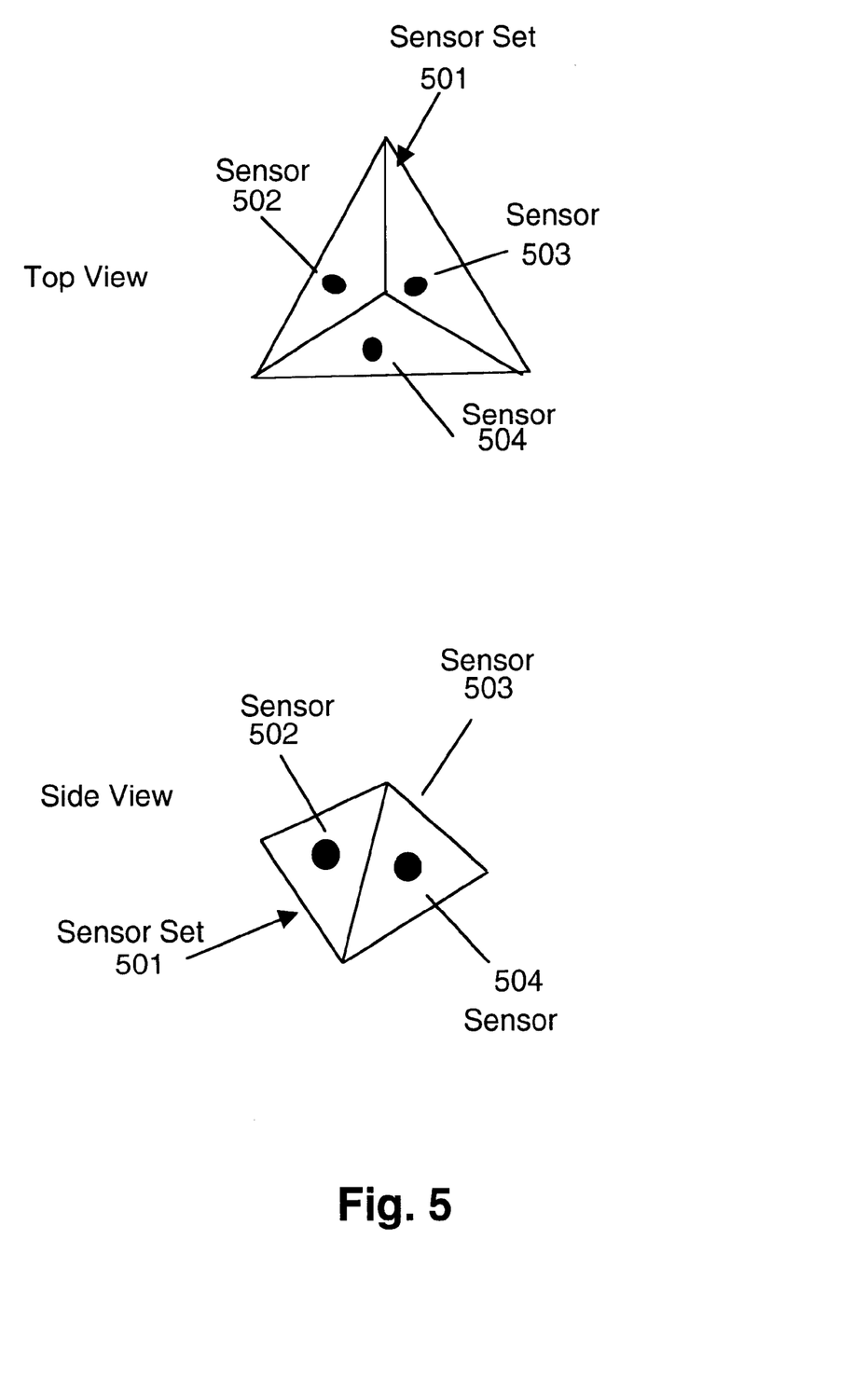
FIG. 5 is a block schematic diagram of a top and side view of a sensor set with three sensors according to the invention.

With respect to FIG. 5, a sensor set 501 with three sensors 502, 503, 504 is shown. Two sensor sets provide information on all translations of a radiation source when using three sensors in a sensor set, but they only provide information on one dimension of rotation of the radiation source. A third sensor set is needed to provide information on other dimensions of rotation.

Referring again to FIGS. 1a and 1b, individual sensors 108 are also included in the invention in conjunction with sensor sets 101, 102, 103 that have two or more sensors to provide additional information on rotational changes and increase the range for rotational measurements. The individual sensors 108 are located at specific locations or on moveable objects. When the sensors are on an object, the information is used to determine when the radiation source is being moved toward or pointed at the object. This direction specific information is used to provide specific commands to a computer or other electronic systems.

More than three sensor sets are included in other embodiments of the invention. Increasing the number of sensor sets greatly increases the spatial range of the tracking system. Under these conditions, information from sensor sets that provide adequate signals from more than one sensor are included in the calculations.

Another reason to include more than three sensor sets is to have sensor sets that are tuned to different wavelengths or types of radiated energy. For example, having multiple sensor sets that are specific for green light, multiple sensor sets that are specific for red light, and multiple sensor sets that are specific for blue light in the same system, allows green, red and blue light sources to be detected individually. Although such a system is more expensive than having a smaller number of sensor sets tuned to a single radiation range, it reduces the need to have only one radiation source on at a time. This greatly increases the frequency at which different radiation sources are monitored. This same goal is also attained by including sensor sets that include sensors tuned to each of the different wavelengths or types of radiated energy. At least two sensors for each radiation range should be included in the sensor sets.

The movements of the radiation sources are measured relative to the sensor sets. Therefore, the sensor set locations may be specified and the radiation source moved with respect to the sensor sets or the locations of the radiation sources may be specified and the sensor sets moved with respect to the radiation sources.

Reflections of the radiation source can be tracked rather than directly tracking the radiation source. One example of this scenario has the radiation source located near to the sensor sets and pointed away from the sensors. Reflectors are attached to objects or body parts which reflect the radiation source, thereby allowing the radiation source to be in a fixed location.

The movement signals provided by the invention can be used to communicate with and control computers and other electronic equipment. The invention provides a new type of wireless control device or can be used in conjunction with existing control devices.

In one embodiment of the invention, the radiation source is mounted on a stylus or pen-shaped device or even on a telephone. In other embodiments of the invention, the radiation source is a remote control device of the type that are readily available with televisions, stereos and other electronic equipment. In still other embodiments, the radiation source is an IrDA communication port as are readily found on personal digital assistants and digitizing pads. Alternatively, the radiation source is mounted directly on the user's body using elastic bands or Velcro, incorporated into a ring or other accessories, or incorporated into clothing.

Figure 6A:
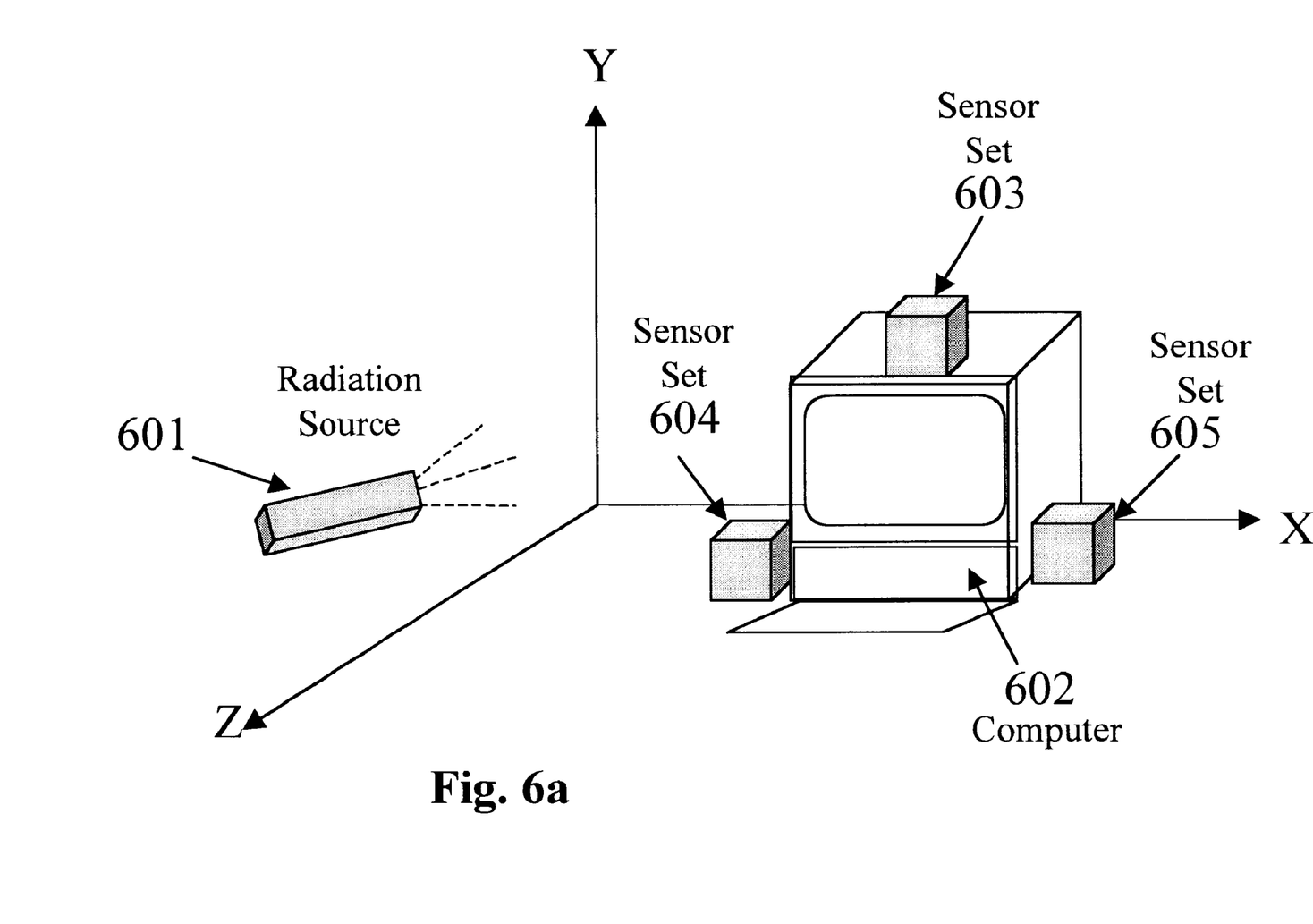
FIG. 6a is a block schematic diagram of an example of a computer application of the invention according to the invention.
Figure 6B:
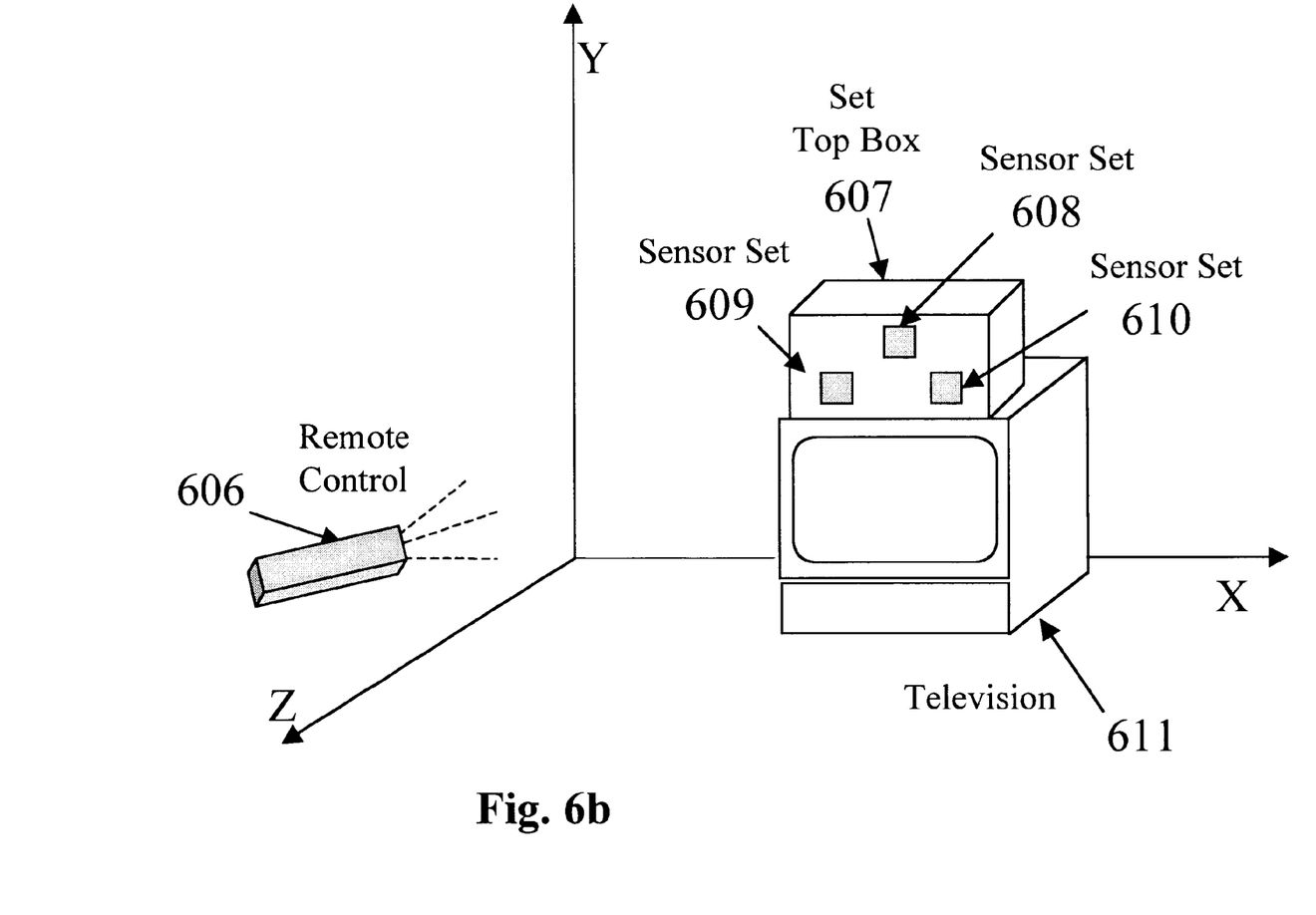
FIG. 6b is a block schematic diagram of an example of a television application of the invention according to the invention.

Referring to FIGS. 6a and 6b, an important use of the invention is to move a cursor on a computer 602 or television screen 611. Three sensor sets 603, 604, 605 are placed around the computer monitor 602. The sensor sets 603, 604, 605 detect the movement of a radiation source contained in a device such as a pen or stylus 601. Cursor movement occurs in two dimensions as with existing computer cursor controllers such as a mouse. Rotations or other movements of the device are used for scrolling through documents and windows. Movements in other dimensions are used as an alternative to clicks or double-clicks of a mouse.

The sensor sets can also be located in a set-top box 607, for example, located near a television set 611. The sensor sets 608, 609, 610 track the movement of a radiation source located in a remote control 606. This allows the user to navigate through on-screen menus and displays in the same manner as a computer screen. The sensor sets can also be incorporated into a monitor or television screen rather than placed around or near them.

The invention is also used to navigate through three-dimensional scenes on a computer or television screen. It provides more intuitive three-dimensional navigation than a mouse or other computer controllers. The invention is also used to select and move objects within a three-dimensional scene.

Another use of the invention is to monitor gestures that are used to control computers and other electronic equipment. Gestures are as simple as a smooth movement in a single direction. More complex movements are also monitored. Different buttons can be used to indicate the intention to produce a gestural command rather than a cursor movements or navigational command.

The invention can also be used to record movements. The recorded movements can be used to animate scenes or to affect the sequencing or timing of media. Recorded movements can also be analyzed offline to measure specific components of the movements, such as the range, number of repetitions and the frequency of movements.

Figure 7:
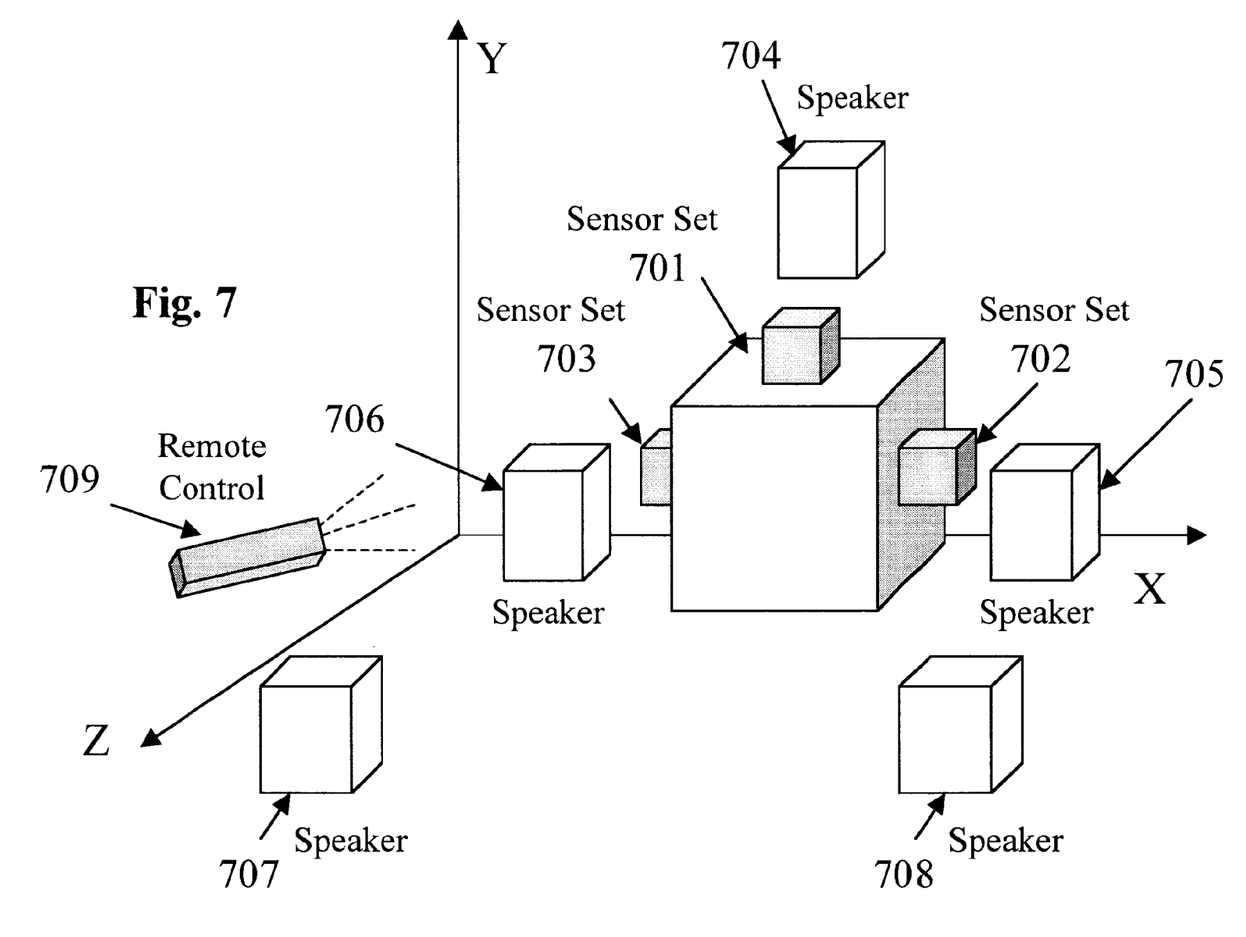
FIG. 7 is a block schematic diagram of an exemplary entertainment center application of the invention according to the invention.

With respect to FIG. 7, an entertainment center's speaker arrangement is shown. The user is generally located within the range of the entertainment system's speakers 704, 705, 706, 707, 708. Three sensor sets 701, 702, 703 are placed within the room where the entertainment center is located. The sensor sets 701, 702, 703 track the movements of a radiation source located in a device such as a remote control 709. The balance of the entertainment center's speakers 704, 705, 706, 707, 708 is automatically adjusted to compensate for the user's location via the tracking of the remote control's 709 location by the sensors 701, 702, 703. Movements of the remote control are also used to provide commands to the entertainment center.

The invention can also be used to monitor the movements of objects or people in manufacturing facilities or other environments. This is very useful for detecting when an object is moving through a known location such as a manufacturing line, the speed at which it is moving and whether it is moving as expected. It is also useful for detecting when a person is at a given location and monitoring the types of actions the person is performing.

This invention can also be used to monitor or record movements independent of a computer environment. Movements can be logged to any type of recording device and replayed at a later time or downloaded to a computer for further analysis.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. An apparatus for spatially tracking an object and determining the translations and rotations of said object, comprising:
   a radiation source;
   at least three sensor sets;
   wherein each sensor set comprises at least two sensors with overlapping, but distinguishable sensing ranges;

wherein said sensors detect said radiation source;

receiving means coupled to said sensor sets for receiving signals from said sensors;

translation calculation means for determining the translations of said radiation source from the relative signals for said sensors within each of said sensor sets;

rotational calculations means for determining rotations of said radiation source from the relative signals between said sensor sets; and wherein individual sensors are included to provide additional information on rotational changes and increase the range for rotational measurements.

2. The apparatus of claim 1, wherein said radiation source is a light emitting diode (LED).

3. The apparatus of claim 1, wherein said radiation source is an incandescent light.

4. The apparatus of claim 1, wherein said radiation source is a sound source.

5. The apparatus of claim 1, wherein said radiation source is an IrDA device.

6. The apparatus of claim 1, wherein a radiation source with a non-symmetric emission profile is used to monitor roll angle changes.

7. The apparatus of claim 1, wherein said translations and said rotations are used to navigate three-dimensional spaces in a computer environment.

8. The apparatus of claim 1, wherein said translations and said rotations are used to manipulate a cursor in a computer environment.

9. The apparatus of claim 1, wherein said translations and said rotations are used to interpret gestures in a computer environment.

10. The apparatus of claim 1, wherein said translations and said rotations are used to interpret movements.

11. The apparatus of claim 10, further comprising:
movement recording means for recording said movements.

12. The apparatus of claim 11, wherein said recorded movements are used for analysis of specific components of said recorded movements.

13. The apparatus of claim 11, wherein said recorded movements are used in animation.

14. The apparatus of claim 11, wherein said recorded movements are used to affect the sequencing or timing of media.

15. The apparatus of claim 1, wherein said radiation source is located in a remote control; wherein said sensor sets are located in a set-top box; and wherein said translations and said rotations are used to manipulate menus and/or objects in a television environment.

16. The apparatus of claim 1, wherein said radiation source is aimed away from said sensor sets; wherein reflectors are affixed to an object; and wherein said sensors detect the reflections of said radiation source from said reflectors.

17. An apparatus for spatially tracking an object and determining the translations and rotations of said object, comprising:
a radiation source;
at least three sensor sets;
wherein each sensor set comprises at least two sensors with overlapping, but distinguishable sensing ranges;
wherein said sensors detect said radiation source;
receiving means coupled to said sensor sets for receiving signals from said sensors;
translation calculation means for determining the translations of said radiation source from the relative signals for said sensors within each of said sensor sets; and
rotational calculations means for determining rotations of said radiation source from the relative signals between said sensor sets.

18. The apparatus of claim 17, wherein said radiation source is a light emitting diode (LED).

19. The apparatus of claim 17, wherein said radiation source is an incandescent light.

20. The apparatus of claim 17, wherein said radiation source is a sound source.

21. The apparatus of claim 17, wherein said radiation source is an IrDA device.

22. The apparatus of claim 17, wherein a radiation source with a non-symmetric emission profile is used to monitor roll angle changes.

23. The apparatus of claim 17, wherein said translations and said rotations are used to navigate three-dimensional spaces in a computer environment.

24. The apparatus of claim 17, wherein said translations and said rotations are used to manipulate a cursor in a computer environment.

25. The apparatus of claim 17, wherein said translations and said rotations are used to interpret gestures in a computer environment.

26. The apparatus of claim 17, wherein said translations and said rotations are used to interpret movements.

27. The apparatus of claim 26, further comprising:
movement recording means for recording said movements.

28. The apparatus of claim 27, wherein said recorded movements are used for analysis of specific components of said recorded movements.

29. The apparatus of claim 27, wherein said recorded movements are used in animation.

30. The apparatus of claim 27, wherein said recorded movements are used to affect the sequencing or timing of media.

31. The apparatus of claim 17, wherein said radiation source is located in a remote control; wherein said sensor sets are located in a set-top box; and wherein said translations and said rotations are used to manipulate menus and/or objects in a television environment.

32. The apparatus of claim 17, wherein said radiation source is aimed away from said sensor sets; wherein reflectors are affixed to an object; and wherein said sensors detect the reflections of said radiation source from said reflectors.

33. An apparatus for spatially tracking an object and determining the translations and rotations of said object, comprising:
at least two radiation sources;
wherein said radiation sources are activated one at a time and/or individually activated at unique frequencies allowing for the discrimination of individual sources;
at least three sensor sets;
wherein each sensor set comprises at least two sensors with overlapping, but distinguishable sensing ranges;
wherein said sensors detect said radiation sources;
receiving means coupled to said sensor sets for receiving signals from said sensors;
translation calculation means for determining the translations of said radiation source from the relative signals for said sensors within each of said sensor sets; and
rotational calculations means for determining rotations of said radiation source from the relative signals between said sensor sets.

34. The apparatus of claim 33, wherein said radiation sources include at least two different types of radiation; and wherein said sensor sets include at least two sensors for each radiation type.

35. The apparatus of claim 33, wherein said radiation sources include at least two different types of radiation; and wherein at least two sensor sets are tuned exclusively for each radiation type.

36. The apparatus of claim 33, wherein said translations and said rotations are used to navigate three-dimensional spaces in a computer environment.

37. The apparatus of claim 33, wherein said translations and said rotations are used to manipulate a cursor in a computer environment.

38. The apparatus of claim 33, wherein said translations and said rotations are used to interpret gestures in a computer environment.

39. The apparatus of claim 33, wherein said translations and said rotations are used to interpret movements.

40. The apparatus of claim 39, further comprising:
movement recording means for recording said movements.

41. The apparatus of claim 40, wherein said recorded movements are used for analysis of specific components of said recorded movements.

42. The apparatus of claim 40, wherein said recorded movements are used in animation.

43. The apparatus of claim 40, wherein said recorded movements are used to affect the sequencing or timing of media.

44. The apparatus of claim 33, wherein said radiation sources are located in a remote control; wherein said sensor sets are located in a set-top box; and wherein said translations and said rotations are used to manipulate menus and/or objects in a television environment.

45. The apparatus of claim 33, wherein said radiation sources are aimed away from said sensor sets; wherein reflectors are affixed to an object; and wherein said sensors detect the reflections of said radiation sources from said reflectors.

46. An apparatus for dynamically adjusting a multi-media entertainment center by spatially tracking an object and determining the translations and rotations of said object in a computer environment, comprising:

a radiation source located in a remote control;

at least two sensor sets;

wherein each sensor set comprises at least two sensors with overlapping, but distinguishable sensing ranges;

wherein said sensors detect said radiation source;

receiving means coupled to said sensor sets for receiving signals from said sensors;

translation calculation means for determining the translations of said radiation source from the relative signals for said sensors within each of said sensor sets;

rotational calculations means for determining rotations of said radiation source from the relative signals between said sensor sets;

adjusting means connected to said entertainment center for adjusting the audio acoustics to the location of said radiation source using said translations and rotations.

47. The apparatus of claim 46, further comprising:

gesture interpretation means connected to said entertainment center for interpreting said translations and rotations as gestures indicating specific commands; and command execution means connected to said entertainment center for executing said specific commands.

* * * * *